Patented Oct. 13, 1970

3,534,039
HETEROCYCLIC AMINE COMPOUNDS AND
METHODS FOR THEIR PRODUCTION
John Davoll, Shepperton, England, assignor to Parke,
Davis & Company, Detroit, Mich., a corporation of
Michigan
No Drawing. Filed Nov. 12, 1968, Ser. No. 775,173
Claims priority, application Great Britain, Nov. 9, 1967,
51,042/67
Int. Cl. C07d 51/46
U.S. Cl. 260—256.4         5 Claims

ABSTRACT OF THE DISCLOSURE 2,7-diamino-6-arylpyrido[2,3-d]pyrimidine compounds in which the aryl group is phenyl, substituted phenyl, or heterocyclic. These compounds are pharmacological agents and especially diuretic agents. They can be produced by (a) reacting a 5-pyramidinecarboxaldehyde with an arylacetonitrile in the presence of a base, (b) replacement of halogen, lower alkoxy, or lower alkylthio at the 2-position of the pyrido[2,3-d]pyrimidine ring system with amino or substituted amino, (c) reducing nitrophenyl group to aminophenyl, (d) hydrolyzing etherified hydroxyphenyl group to hydroxyphenyl, or (e) nitrating phenyl group to nitrophenyl.

SUMMARY AND DETAILED DESCRIPTION

The present invention relates to new heterocyclic amine compounds. More particularly, the invention relates to new 2,7-diamino-6 - arylpyrido[2,3-d]pyrimidine compounds, to salts therof, and to methods for the production of the foregoing compounds.

In the forms of their free bases, the compounds of the invention can be represented by the formula

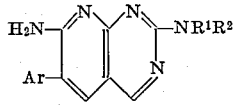

where each of $R^1$ and $R^2$ represents hydrogen or lower alkyl; and Ar represents thienyl, furyl, pyrrolyl, pyridyl, or a group of the formula

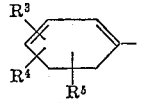

where each of $R^3$, $R^4$, and $R^5$ represents hydrogen, lower alkyl, lower alkoxy, lower alkylthio, halogen, hydroxy, nitro, amino, or di-(lower alkyl)amino. The lower alkyl, lower alkoxy, and lower alkylthio groups are those containing not more than 4 carbon atoms and are preferably methyl, methoxy, and methylthio.

In accordance with the invention, the compounds of the foregoing formula and their salts can be produced by reducing a 5-pyrimidinecarboxaldehyde compound of the formula

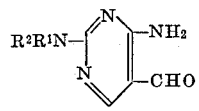

with an arylacetonitrile compound of the formula

in the presence of a base, followed by isolating the product directly as the free base or phenolate salt or, following treatment with an acid, as an acid-addition salt; where $R^1$, $R^2$, and Ar are as defined before. Some examples of suitable bases that can be used in carrying out the reaction are sodium hydride and alkali metal alkoxides. The sodium salt of 2-ethoxyethanol (sodium 2-ethoxyethoxide) is preferred. Some examples of suitable solvents for the reaction are lower alkanols, lower alkoxyalkanols, nitrobenzene, dimethylsulfoxide, and tertiary amides. 2-ethoxyethanol is the preferred solvent. It is customary to use the 5-pyrimidinecarboxaldehyde compound and the arylacetonitrile compound in approximately equimolar quantities although, if desired, a moderate excess of either can be used. The time and temperature of the reaction are not particularly critical. In general, the reaction is carried out at a temperature between about 80 and 150° C. or at the reflux temperature of the solvent for from 1 to 6 hours. Using the preferred solvent, 2-ethoxyethanol, at the reflux temperature, the reaction is substantially complete within a period of 2 hours. The product is isolated directly from the basic reaction mixture as the free base or phenolate salt or, following treatment with an acid, as an acid-addition salt.

Also in accordance with the invention, the compounds of the invention can be produced by reacting a 2-substituted-7-amino-6 - arylpyrido[2,3-d]pyrimidine compound of the formula

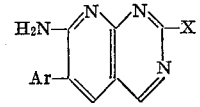

with ammonia or a substituted ammonia of the formula

where $R^1$, $R^2$, and Ar are as defined before, and X represents halogen, lower alkoxy, or lower alkylthio. In order to obtain a good yield of product over a wide range of reaction conditions, it is preferred that none of the substituents $R^3$, $R^4$, and $R^5$, if present in the group Ar, represents lower alkylthio or halogen. Some suitable solvents for the reaction are relatively non-reactive solvents such as ethanol, aqueous ethanol, ether, tetrahydrofuran, dioxane, benzene, toluene, xylene, chloroform, and dimethylformamide. Especially in those cases where the compound $R^1R^2NH$ is a higher boiling amine, an excess of that amine can be employed as a solvent. At least the calculated amount, and preferably a large excess, of the compound $R^1R^2NH$ is used. The time and temperature of the reaction can be varied over a relatively wide range. In general, the reaction is carried out at a temperature from about 35 to 175° C. for from 1 to 48 hours. When one of the reactants is ammonia or a low boiling amine, it is customary to carry out the reaction in a sealed reaction vessel. When one of the reactants is a higher boiling amine, it is customary to carry out the reaction at the reflux temperature of the solvent. The product is isolated from the reaction mixture as the free base, as a phenolate salt, or as an acid-addition salt, following adjustment of the pH as necessary.

Many of the starting materials required for use in the foregoing processes are known, and others can be prepared by any of a variety of methods. p-(Lower alkoxy)-phenylacetonitriles can be obtained by reacting p-hydroxyphenylacetonitrile with lower alkyl halides in the presence of sodium hydride. 4-amino-2-methoxy-5-pyrimidinecarbonitrile is prepared by reacting methylisourea with ethoxymethylenemalononitrile in the presence of sodium ethoxide, and is converted by hydrogenation in acetic acid in the presence of phenylhydrazine to 4-amino-2-methoxy-5-pyrimidinecarboxaldehyde phenylhydrazone acetate salt. The latter compound is heated with m-nitrobenzaldehyde in aqueous acetic acid and the product basified to produce 4-amino-2-methoxy-5 - pyrimidinecarboxaldehyde.

That product is reacted with p-methoxyphenylacetonitrile in the presence of sodium 2-ethoxyethoxide to produce 7-amino-2-methoxy-6-(p-methoxyphenyl)pyrido[2,3 - d] pyrimidine. By similar procedures, various 4-amino-2-(substituted amino)-5-pyrimidinecarboxaldehydes are prepared from the corresponding 4-amino-2-(substituted amine)-5-pyrimidinecarbonitriles. Other starting materials can be prepared by modifications of the procedures illustrated.

Further in accordance with the invention, the compounds of the invention wherein one of the substituents $R^3$, $R^4$, and $R^5$ represents amino, can be produced by reacting a compound wherein the corresponding substituent represents nitro, with a reducing agent. To avoid competing side-reactions, it is generally preferred that none of the remainder of the substituents $R^3$, $R^4$, and $R^5$ represents lower alkylthio or halogen. Some examples of suitable reducing agents are iron in acetic acid; iron, tin, or stannous chloride in hydrochloric acid; zinc in aqueous sodium hydroxide; and zinc or aluminum amalgam in ethanol. Other suitable reducing agents are hydrogen in the presence of a Raney nickel or noble metal catalyst. One or more additional solvents can be present, such as water, a lower alkanol, diethylene glycol, dioxane, tetrahydrofuran, dimethylformamide, or acetic acid. The time and temperature of the reaction depend somewhat on the particular reactants selected. In general, the reaction is carried out at a temperature from 0 to 150° C. for from 10 minutes to 4 hours. In the case of catalytic hydrogenation, the usual reaction conditions are 15 to 60° C. and 1 to 5 atmospheres of hydrogen pressure for up to a few hours, or until the calculated amount of hydrogen has been absorbed. In the case of iron in acetic acid, which is representative of the chemical reducing systems, the usual reaction conditions are 50° C. to the reflux temperature, for from 10 minutes to 4 hours, preferably 75 to 100° C. for ½ hour to 2 hours. The reducing agent is preferably used in excess except that, in those cases where the starting material contains other reducible groups, the quantity of reducing agent is limited to the calculated amount and the reaction conditions are selected to be relatively mild. The product is isolated from the reaction mixture as the free base, as a phenolate salt, or as an acid-addition salt following adjustment of the pH as necessary.

Still further in accordance with the invention, the compounds of the invention wherein one of the substituents $R^3$, $R^4$, and $R^5$ represents hydroxy, can be produced by reacting a compound wherein the corresponding substituent represents

AO— with an acidic hydrolyzing agent; where A represents tetrahydropyranyl or trityl (otherwise known as triphenylmethyl). Some examples of suitable hydrolyzing agents are aqueous formic acid and aqueous mineral acids such as dilute sulfuric acid or dilute hydrochloric acid. An additional solvent is not necessary but, if desired, any of a variety of solvents such as a lower alkanol, acetone, tetrahydrofuran, ethylene glycol, or dioxane can be used. In general, the hydrolysis reaction is carried out at temperatures ranging from 0 to 100° C. or the reflux temperature, for from a few minutes to one hour. Preferred reaction conditions are boiling aqueous formic acid for approximately 5 minutes. Reaction times and temperatures more drastic than necessary are avoided, especially in those cases where the starting material contains other groups sensitive to hydrolytic conditions. The product is isolated from the reaction mixture as the free base, as a phenolate salt, or as an acid-addition salt following adjustment of the pH as necessary.

Starting materials required for use in the foregoing process can be prepared by any of a vaiety of methods. For example, p-hydroxyphenylacetonitrile is reacted with dihydropyran in the presence of p-toluenesulfonic acid and the resulting p-(tetrahydropyran - 2 - yloxy)phenylacetonitrile is reacted with 2,4-diamino-5-pyrimidinecarboxaldehyde in the presence of sodium 2-ethoxyethoxide to produce 2,7-diamino-6 - [p - (tetrahydropyran - 2 - yloxy)phenyl]-pyrido[2,3-d]pyrimidine.

Yet further in accordance with the invention, the compounds of the invention wherein one of the substituents $R^3$, $R^4$, and $R^5$ represents nitro, can be produced by reacting a compound wherein the corresponding substituent represents hydrogen, with a nitrating agent. To avoid competing side-reactions, it is generally preferred that each of the remainder of the substituents $R^3$, $R^4$, and $R^5$ represents hydrogen, lower alkyl, lower alkoxy, or halogen. Some examples of suitable nitrating agents are alkali metal nitrates in the presence of sulfuric acid; concentrated nitric acid; nitrogen tetroxide; and nitric acid-sulfuric acid mixtures. Preferred nitrating agents are potassium nitrate or sodium nitrate in the presence of sulfuric acid. The sulfuric acid or other acid present serves as a solvent and an additional solvent is not ordinarily used. Either the calculated amount or a slight excess of the nitrating agent is normally used; larger excesses of nitrating agents are generally avoided. The reaction is preferably carried out at room temperature or below and within the preferred range of 10–20° C., a reaction time of 5 minutes to one hour is adequate. If desired, the reaction can be continued for a longer time to ensure a more nearly complete reaction. The product is isolated from the reaction mixture as the free base, as a phenolate salt, or as an acid-addition salt following adjustment of the pH as necessary.

The free bases of the invention form acid-addition salts with any of a variety of inorganic and organic acids. Pharmaceutically-acceptable acid-addition salts are formed with such acids as hydrochloric, hydrobromic, sulfuric, nitric, phosphoric, acetic, citric, tartaric, succinic, benzoic, salicylic, maleic, malic, gluconic, ascorbic, and pamoic acids. The phenols of the invention, that is the compounds wherein one of the substituents $R^3$, $R^4$, and $R^5$ represents hydroxy, also form phenolate salts with any of a variety of bases such as sodium hydroxide, potassium hydroxide, and choline. The free bases and their salt forms are interconvertible by adjustment of the pH. They differ in solubility properties but in general are otherwise equivalent for the purposes of the invention.

The compounds of the invention are useful as pharmacological agents and especially as diuretic agents. They produce increased excretion of water and sodium with little or no effect on potassium excretion. The compounds of the invention are active upon oral administration but can also be given by the parenteral route if desired. Their activity as diuretic agents can be measured by standard diuretic assays. For example, a compound of the invention is administered orally (by gavage) with saline to rats that have been subjected to an 18-hour fast from food and water. The urine volume, sodium excretion, and potassium excretion are measured during the 5-hour period following drug administration and compared with corresponding control values in rats that received salline alone without a test compound. In this assay procedure, the following results were obtained for 2,7-diamino-6-phenyl-pyrido[2,3-d]pyrimidine, a representative compound of the invention, administered at dose of 20 mg./kg.: urine volume, 43.4 ml./kg. (control value 11.5 ml./kg.); sodium excretion, 7.8 milliequivalents/kg. (control value 1.9 milliequivalents/kg.); potassium excretion, 0.6 milliequivalent/kg. (control value 0.6 milliequivalent/kg.). The folowing results were obtained for 2,7-diamino-6-(p - methoxyphenyl)pyrido[2,3-d]pyrimidine, another representative compound of the invention, administered at dose of 20 mg./kg.: urine volume, 44.0 ml./kg. (control value 10.0 ml./kg.); sodium excretion, 7.7 milliequivalents/kg. (control value 1.6 milliequivalents/kg.); potassium excretion, 0.6 milliequivalent/kg. (control value 0.5 milliequivalent/kg.). An additional advantage of the compounds of the invention is that they possess no more than a low order of antifolic activity.

The invention is illustrated by the following examples.

EXAMPLE 1

A solution of sodium 2-ethoxyethoxide is prepared from 0.14 g. of sodium and 60 ml. of 2-ethoxyethanol, and 2.07 g. of 2,4-diamino-5-pyrimidinecarboxaldehyde, and 1.76 g. of phenylacetonitrile are added. The mixture is heated at reflux for 2 hours and cooled, and the insoluble product, 2,7 - diamino-6-phenylpyrido[,3-d]pyrimidine, is collected on a filter. For purification, this product is dissolved in a hot solution of 100 ml. of dimethylformamide and 20 ml. of glacial acetic acid and the solution stirred with activated charcoal and filtered. The filtrate is made basic by addition of a solution of 40 ml. of concentrated aqueous ammonia in 100 ml. of dimethylformamide. An additional 100 ml. of water is added and after crystallization of the product is complete, it is collected on a filter; M.P. 317–318° C.

A mixture of 2.37 g. of the above-described free base and 0.48 g. of sulfuric acid in 50 ml. of 50% aqueous ethanol is heated to give a clear solution and then cooled. The insoluble product which separates is collected on a filter, washed with water, with ethanol, and with ether, and dried in vacuo. It is a hydrated salt with one-half formula weight sulfuric acid; decomposes at 229–231° C.

A mixture of 2.37 g. of the free base described above and 50 ml. of 50% aqueous formic acid is heated to give a clear solution and then cooled. The insoluble product which separates is collected on a filter, washed with water, with ethanol, and with ether, and dried in vacuo. It is the salt with one formula weight formic acid; decomposes at 319–322° C.

A mixture of 1.0 g. of the free base described above, 2 ml. of 85% lactic acid, and 20 ml. of 50% aqueous ethanol is heated to boiling and filtered while hot. The filtrate is cooled and the insoluble salt with lactic acid is collected on a filter. Similarly, substituting 2 g. of d-tartaric acid for the lactic acid, the product obtained is the salt with one formula weight tartaric acid; M.P. 190–193° C.

A mixture of 2.4 g. of the free base described above, 4.8 g. of sulfamic acid, and 25 ml. of water is heated to give a clear solution and then cooled. The insoluble product which separates is collected on a filter, washed with ethanol and with ether, and dried. It is a hydrated salt with two formula weights sulfamic acid; M.P. higher than 305° C.

EXAMPLE 2

By the procedure of Example 1, with the substitution of an equivalent amount of o-methylphenylacetonitrile for the phenylacetonitrile, the product obtained is 2,7 - diamino - 6 - (o - tolyl)pyrido[2,3-d]pyrimidine. For purification, the crude product is dissolved in excess cold 2 N hydrochloric acid and the solution is stirred with charcoal, filtered, diluted with hot ethanol, and made basic with aqueous ammonia. The product is collected on a filter; M.P. 300–302° C.

EXAMPLE 3

By the procedure of Example 2, with the substitution of the equivalent amount of m-methylphenylacetonitrile for the o-methylphenylacetonitrile, the product obtained is 2,7 - diamino - 6 - (m-tolyl)pyrido[2,3-d]pyrimidine; M.P. 297–299° C.

EXAMPLE 4

By the procedure of Example 2, with the substitution of an equivalent amount of p-methylphenylacetonitrile for the o-methylphenylacetonitrile, and 5 N hydrochloric acid for the 2 N hydrochloric acid in the purification step, the product obtained is 2,7 - diamino - 6 - (p-tolyl)pyrido-[2,3-d]pyrimidine; M.P. 332–334° C.

EXAMPLE 5

By the procedure of Example 1, with the substitution of an equivalent amount of p-fluorophenylacetonitrile for the phenylacetonitrile, the product obtained is 2,7 - diamino - 6 - (p - fluorophenyl)pyrido[2,3-d]pyrimidine. For purification, a solution of the crude product in hot dimethylformamide is stirred with charcoal, filtered, and diluted with water. The insoluble product is collected; decomposes at 340–341° C.

EXAMPLE 6

By the procedure of Example 1, with the substitution of an equivalent amount of p-chlorophenylacetonitrile for the phenyl acetonitrile, the product obtained is 2,7-diamino - 6 - (p-chlorophenyl)pyrido[2,3 - d]pyrimidine. For purification, a solution of the crude product in hot dimethlyformamide containing formic acid is stirred with charcoal, filtered, and basified with aqueous triethylamine. The product is collected on a filter; decomposes at 356–357° C.

EXAMPLE 7

By the procedure of Example 5, with the substitution of an equivalent amount of p-bromophenylacetonitrile for the p-fluorophenylacetonitrile, the product obtained is 2,7 - diamino - 6 - (p-bromophenyl)pyrido[2,3-d]pyrimidine; decomposes at 362–363° C.

EXAMPLE 8

By the procedure of Example 5, with the substitution of an equivalent amount of 2,6-dichlorophenylacetonitrile for the p-fluorophenylacetonitrile, the product obtained is 2,7 - diamino - 6 - (2,6-dichlorophenyl)prrido[2,3-d]pyrimidine; decomposes at 321–322° C.

EXAMPLE 9

By the procedure of Example 5, with the substitution of an equivalent amount of p-methoxyphenylacetonitrile for the p-fluorophenylacetonitrile, the product obtained is 2,7 - diamino - 6 - (p-methoxyphenyl)pyrido[2,3-d]pyrimidine; decomposes at 327–328° C. This free base is converted to a salt with formic acid and a salt with sulfamic acid by reaction with formic acid and sulfamic acid respectively.

EXAMPLE 10

By the procedure of Example 5, with the substitution of an equivalent amount of p-methylthiophenylacetonitrile, for the p-fluorophenylacetonitrile, the product obtained is 2,7 - diamino - 6 - (p-methylthiophenyl)pyrido[2,3-d]pyrimidine.

EXAMPLE 11

By the procedure of Example 5, with the substitution of an equivalent amount of 3 - fluoro - 4 - methoxyphenyl-acetonitrile for the p-fluorophenylacetonitrile, the product obtained is 2,7 - diamino - 6 - (3-fluoro-4-methoxyphenyl)pyrido[2,3-d]pyrimidine.

EXAMPLE 12

By the procedure of Example 1, with the substitution of an equivalent amount of 3,4-dimethoxyphenylacetonitrile for the phenylacetonitrile, the product obtained is 2,7-diamino - 6 - (3,4 - dimethoxyphenyl)pyrido[2,3-d]pyrimidine; decomposes at 345° C.

EXAMPLE 13

By the procedure of Example 5, with the substitution of an equivalent amount of 3,4,5-trimethoxyphenylacetonitrile for the p-fluorophenylacetonitrile, the product obtained is 2,7 - diamino-6-(3,4,5 - trimethoxyphenyl)-pyrido[2,3-d]pyrimidine; decomposes at 290–291° C.

EXAMPLE 14

By the procedure of Example 5, with the substitution of an equivalent amount of p-isobutoxyphenylacetonitrile for the p-fluorophenylacetonitrile, the product obtained is 2,7 - diamino - 6 - (p-isobutoxyphenyl)pyrido[2,3-d] pyrimidine; M.P. 309–314° C.

EXAMPLE 15

By the procedure of Example 5, with the substitution of an equivalent amount of p-sec-butoxyphenylacetonitrile for the p-fluorophenylacetonitrile, the product obtained is 2,7 - diamino - 6 - (p-sec-butoxyphenyl)pyrido-[2,3-d]pyrimidine; M.P. 310–313° C.

The starting material can be obtained as follows. A solution of 2.7 g. of p-hydroxyphenylacetonitrile and 20 ml. of dimethylformamide is treated with 1.0 g. of a 55% dispersion of sodium hydride in mineral oil. After hydrogen evolution ceases, 3.7 g. of sec-butyl iodide is added and the resulting mixture stirred for one hour. The mixture is filtered and the filtrate concentrated under reduced pressure to give a residue of p-(sec-butoxy)-phenylacetonitrile, suitable for use without further purification.

EXAMPLE 16

By the procedure of Example 1, with the substitution of an equivalent amount of p-aminophenylacetonitrile for the phenylacetonitrile, the product obtained in 2,7-diamino - 6 - (p-aminophenyl)pyrido[2,3-d]pyrimidine. For purification, it is dissolved in aqueous ethanolic hydrochloric acid, precipitated with sodium hydroxide, and crystallized from aqueous ethanol; decomposes at 319–320° C.

EXAMPLE 17

By the procedure of Example I, with the substitution of an equivalent amount of p-dibutylaminophenylacetonitrile for the phenylacetonitrile, the product obtained is 2,7 - diamino - 6 - [p-(dibutylamino)phenyl]pyrido[2,3-d]pyrimidine. For purification, the product is crystallized from ethanol; decomposes at 253–254° C. The starting material p-dibutylaminophenylacetonitrile, B.P. 126–128° C. at 0.1 mm., is obtained by substituting an equivalent amount of butyl iodide for the ethyl iodide in the procedure of Chemical Abstracts, 53, 8125 (1959).

EXAMPLE 18

By the procedure of Example 1, with the substitution of an equivalent amount of 4-amino-2-dimethylamino-5-pyrimidinecarboxaldehyde for the 2,4 - diamino - 5 - pyrimidinecarboxaldehyde, the product obtained is 7-amino-2-(dimethylamino) - 6 - phenylpyrido[2,3-d]pyrimidine. For purification, it is dissolved in ethanolic glacial acetic acid and precipitated with aqueous ammonia; M.P. 245–246° C.

EXAMPLE 19

By the procedure of Example 1, with the substitution of an equivalent amount of 2-pyridylacetonitrile for the phenylacetonitrile, the product obtained is 2,7-diamino-6 - (2 - pyridyl)pyrido[2,3-d]pyrimidine. For purification, it is dissolved in excess 2 N hydrochloric acid and the solution is treated with charcoal, diluted with hot ethanol, and made basic with sodium hydroxide. The insoluble product is collected on a filter; M.P. 312–313° C.

EXAMPLE 20

By the procedure of Example 1, with the substitution of an equivalent amount of 3-pyridylacetonitrile for the phenylacetonitrile, the product obtained is 2,7-diamino - 6 - (3 - pyridyl)pyrido[2,3-d]pyrimidine. For purification, it is dissolved in excess 2 N hydrochloric acid and the solution is treated with charcoal, diluted with hot ethanol, and made basic with sodium hydroxide. The insoluble product is collected on a filter; decomposes at 317–319° C.

EXAMPLE 21

By the procedure of Example 1, with the substitution of an equivalent amount of 4-pyridylacetonitrile for the phenylacetonitrile, the product obtained is 2,7-diamino-6 - (4 - pyridyl)pyrido[2,3-d]pyrimidine. The dihydrochloride, M.P. greater than 360° C., is obtained by crystallization of the free base from 2 N hydrochloric acid.

EXAMPLE 22

A solution of sodium 2-ethoxyethoxide is prepared from 0.07 g. of sodium and 30 ml. of 2-ethoxyethanol, and 1.61 g. of p-ethoxyphenylacetonitrile and then 1.38 g. of 2,4 - diamino - 5 - pyrimidinecarboxaldehyde are added. The mixture is heated at reflux for 2 hours and cooled and the insoluble product, 2,7 - diamine - 6 - (p-ethoxyphenyl)pyrido[2,3-d]pyrimidine, is collected on a filter. For purification, it is crystallized from dimethylformamide; hydrated, M.P. 322–325° C.

EXAMPLE 23

By the procedure of Example 22, with the substitution of an equivalent amount of p-propoxyphenylacetonitrile for the p-ethoxyphenylacetonitrile, the product obtained is 2,7-diamino - 6 - (p-propoxyphenyl)pyrido[2,3-d]pyrimidine; M.P. 310–312° C.

EXAMPLE 24

By the procedure of Example 22, with the substitution of an equivalent amount of p-isopropoxyphenylacetonitrile for the p-ethoxyphenylacetonitrile, the product obtained is 2,7-diamino-6-(p-isopropoxyphenyl)pyrido[2,3-d]pyrimidine; M.P. 321–323° C.

EXAMPLE 25

By the procedure of Example 22, with the substitution of an equivalent amount of p-butoxyphenylacetonitrile for the p-ethoxyphenylacetonitrile, the product obtained is 2,7 - diamino - 6-(p-butoxyphenyl)pyrido[2,3-d]pyrimidine; M.P. 295–298° C.

EXAMPLE 26

By the procedure of Example 22, with the substitution of an equivalent amount of p-dimethylaminophenylacetonitrile for the p-ethoxyphenylacetonitrile, the product is 2,7-diamino-6-[p-(dimethylamino)phenyl]pyrido-[2,3-d]pyrimidine; decomposes at 349–351° C.

EXAMPLE 27

By the procedure of Example 22, with the substitution of an equivalent amount of p-diethylaminophenylacetonitrile for the p-ethoxyphenylacetonitrile, the product obtained is 2,7-diamino-6-[p-(diethylamino)phenyl]pyrido-[2,3-d]pyrimidine; decomposes at 344–346° C.

EXAMPLE 28

By the procedure of Example 22, with the substitution of the equivalent amount of p-dipropylaminophenylacetonitrile for the p-ethoxyphenylacetonitrile, the product obtained is 2,7 - diamino - 6-[p-(dipropylamino)phenyl] pyrido[2,3-d]pyrimidine; M.P. 289–291° C. The starting material p-dipropylaminophenylacetonitrile, B.P. 112° C. at 1 mm., is obtained by substituting an equivalent amount of propyl iodide for the ethyl iodide in the procedure of Chemical Abstracts, 53, 8125 (1959).

EXAMPLE 29

By the procedure of Example 22, with the substitution of an equivalent amount of 2-thienylacetonitrile for the p-ethoxyphenylacetonitrile, the product obtained is 2,7 - diamino - 6 - (2-thienyl)pyrido[2,3-d]pyrimidine; decomposes at 315–317° C.

EXAMPLE 30

By the procedure of Example 22, with the substitution of an equivalent amount of 2-furylacetonitrile for the p-ethoxyphenylacetonitrile, the product obtained is 2,7-diamino-6-(2-furyl)pyrido[2,3-d]pyrimidine; decomposes at 295–297° C.

EXAMPLE 31

A mixture of 5.4 g. of sodium methoxide, 11.3 g. of 4-amino-2-(propylamino)-5-pyrimidinecarboxaldehyde, 5.9 g. of phenylacetonitrile, and 250 ml. of 2-ethoxyethanol is heated at reflux for 2 hours and cooled. The insoluble product is collected on a filter. It is 7-amino-6-phenyl-2-(propylamino)pyrido[2,3 - d]pyrimidine; decomposes at 265–268° C.

In the same manner, by the substitution of an equivalent amount of p-methoxyphenylacetonitrile for the phenylacetonitrile, the product obtained is 7-amino-6-(p - methoxyphenyl) - 2 - (propylamino)pyrido[2,3-d] pyrimidine; M.P. 269–270° C. following crystallization from 2-ethoxyethanol.

The starting materials can be obtained as follows. A solution of 10.6 g. of 4-amino-2-propylamino-5-pyrimidinecarbonitrile and 320 ml. of hot glacial acetic acid is cooled to room temperature and treated with 9.4 ml. of phenylhydrazine. The resulting mixture is shaken with 1 g. of Raney nickel catalyst with hydrogen at atmospheric pressure until 2.3 liters of hydrogen is absorbed. The mixture is heated to dissolve the product and filtered through diatomaceous silica. The insoluble 4-amino-2-propylamino-5-pyrimidinecarboxaldehyde phenylhydrazone acetate salt which precipitates is collected on a filter. Similarly, from 4 - amino - 2-dimethylamino-5-pyrimidinecarbonitrile, the product is 4 - amino - 2 - dimethylamino-5-pyrimidinecarboxaldehyde phenylhydrazone acetate salt.

A solution of 13.2 g. of 4-amino-2-propylamino-5-pyrimidinecarboxaldehyde phenylhydrazone acetate, 7.35 g. of m-nitrobenzaldehyde, and 200 ml. of 50% acetic acid is heated at reflux for 6 hours, allowed to cool overnight, and then filtered. The filtrate is diluted with 100 ml. of water, washed with chloroform, stirred with activated charcoal, and poured into excess 10 N sodium hydroxide maintained at 0–5° C. The insoluble 4-amino-2-propylamino-5-pyrimidinecarboxaldehyde is collected on a filter; M.P. 146–147° C. following crystallization from ethanol containing ammonia. Similarly, from 4-amino-2-dimethylamino-5-pyrimidinecarboxaldehyde phenylhydrazone acetate, the product is 4-amino-2-dimethylamino-5-pyrimidinecarboxaldehyde; M.P. 158–159° C. following crystallization from water.

EXAMPLE 32

A mixture of 8.7 g. of 2,4 - diamino - 5 - pyrimidine-carboxaldehyde, 4.0 g. of sodium methoxide, 7.3 g. of 1-pyrrolylacetonitrile, and 100 ml. of 2-ethoxyethanol is heated at reflux for one hour and cooled. The insoluble 2,7 - diamino - 6-pyrrol-1-ylpyrido[2,3-d]pyrimidine is collected on a filter; it decomposes at 325–340° C. following crystallization from ethanol.

EXAMPLE 33

A mixture of 2.2 g. of 2,7-diamino-6-(p-nitrophenyl)pyrido[2,3-d]pyrimidine, 30 ml. of glacial acetic acid, and 0.2 g. of 10% palladium on charcoal catalyst is shaken in contact with hydrogen at a pressure of one atmosphere at 20° C. and then at 60° C. until absorption of hydrogen ceases. The mixture is filtered and the filtrate is concentrated to a volume of 4 ml., diluted with 100 ml. of boiling ethanol, heated to give a clear solution, and then made basic with aqueous ammonia. The mixture is concentrated to a volume of 25 ml., treated with additional aqueous ammonia, and filtered. The product collected on the filter is 2,7-diamino-6-(p-aminophenyl)pyrido[2,3-d] pyrimidine; it decomposes at 319–320° C. following several crystallizations from aqueous ethanol.

Hydrochloride and citrate salts are obtained by reacting the free base with hydrogen chloride in ether and with citric acid in methanol.

EXAMPLE 34

A solution of 1.0 g. of 2,7-diamino-6-[p-(tetrahydropyran-2-yloxy)phenyl]pyrido[2,3-d]pyrimidine and 15 ml of 50% formic acid is heated to the reflux temperature, cooled to 80° C., and diluted with 15 ml. of concentrated aqueous ammonia in 50 ml. of warm ethanol. The mixture is cooled and the insoluble p-(2,7-diaminopyrido [2,3-d]pyrimidin-6-yl)phenol is collected on a filter. For purification, it is crystallized from 30 ml. of 65% ethanol containing 3 ml. of concentrated aqueous ammonia; M.P. 311° C.

Hydrochloride and citrate salts are obtained by reacting the free base with hydrogen chloride in ether and with citric acid in methanol. The sodium and potassium salts are obtained by reacting the free base (free phenol) with sodium hydroxide and with potassium hydroxide.

The starting materials can be obtained as follows. A solution of 1.3 g. of p-hydroxyphenylacetonitrile and 15 ml. of 2-ethoxyethanol) is treated with 2.17 g. of p-(tetra-then with 0.2 g. of p-toluenesulfonic acid. The mixture is stirred for 20 hours, washed with dilute sodium hydroxide and water, dried over anhydrous magnesium sulfate, filtered, and evaporated to give a residue of p-(tetrahydropyran-2-yloxy)phenylacetonitrile. A solution of sodium 2-ethoxyethoxide (prepared from 0.07 g. of sodium and 30 ml. of 2-ethoxyethanol) is treated with 217 g. of p-(tetrahydropyran-2-yloxy)phenylacetonitrile and then with 1.38 g. of 2,4-diamino-5-pyrimidinecarboxaldehyde. The mixture is heated at reflux for 2 hours and cooled. The insoluble 2,7-diamino-6-[p - (tetrahydropyran - 2 - yloxy) phenyl]pyrido[2,3-d]pyrimidine is collected on a filter; it decomposes at 265° C. following crystallization from dimethylformamide.

EXAMPLE 35

With stirring and external cooling to maintain the temperature below 20° C., 12.0 ml. of concentrated sulfuric acid and then 1.01 g. of potassium nitrate are slowly added to 1.90 g. of 2,7-diamino-6-phenylpyrido[2,3-d] pyrimidine. The mixture is stirred at room temperature for 4 hours, poured onto crushed ice, and made basic with aqueous ammonia. The insoluble 2,7-diamino-6-(p-nitrophenyl)pyrido[2,3-d]pyrimidine is collected on a filter and washed with water. For purification, it is crystallized from a solution of 50 ml. of dimethylformamide and 15 ml. of 98% formic acid, and the product then stirred for 2 hours with ethanol containing ammonia to recover the free base; M.P. greater than 360° C.

The hydrochloride and lactate salts are obtained by reacting the free base with hydrogen chloride in ether and with lactic acid in aqueous ethanol.

EXAMPLE 36

A solution of 3 g. of 7-amino-2-methoxy-6-(p-methoxyphenyl)pyrido[2,3-d]pyrimidine and 30 ml. of 33% methylamine in ethanol is heated in a sealed tube at 150° C. for 18 hours. The mixture is cooled and the insoluble 7-amino-6-(p-methoxyphenyl) - 2 - (methylamino)pyrido [2,3-d]pyrimidine is collected on a filter; M.P. 252–254° C. following crystallization from dimethylformamide.

Similarly, by substituting an equivalent amount of ammonia for the methylamine, the product obtained is 2,7-diamino-6 - (p - methoxyphenyl)pyrido[2,3-d]pyrimidine; decomposes at 327–328° C.

Hydrochloride and sulfamate salts are obtained by reacting either free base with hydrogen chloride in ether and with sulfamic acid in water.

The starting material can be obtained as follows. A solution of sodium ethoxide (prepared from 25 g. of sodium and 600 ml. of ethanol) is added to 98.7 g. of methylisourea hydrochloride. The mixture is filtered and the filtrate treated with 133 g. of ethoxymethylene-malononitrile at a temperature below 30° C. The mixture is stirred for one hour at room temperature, heated at reflux for 3 hours, and cooled. The insoluble 4-amino-2-methoxy-5-pyrimidinecarbonitrile is collected on a filter and dried; M.P. 217–219° C. A. solution of 9.0 g. of this product and 320 ml. of hot glacial acetic acid is cooled to room temperature and treated with 9.4 ml. of phenylhydrazine. The resulting mixture is shaken with 1 g. of Raney nickel catalyst, with hydrogen at atmospheric pressure until 2.3 liters of hydrogen is absorbed. The mixture is heated to dissolve the product and filtered through diatomaceous silica. The insoluble 4-amino-2-methoxy-5-pyrimidinecarboxaldehyde phenylhydrazone acetate salt which precipitates is collected on a filter. A solution of 12.1 g. of this product, 7.35 g. of m-nitrobenzaldehyde, and 200 ml. of 50% acetic acid is heated at reflux for 6 hours, allowed to cool overnight, and then filtered. The filtrate is diluted with 100 ml. of water, washed with chloroform, stirred with activated charcoal, and poured into excess 10 N sodium hydroxide maintained at 0–5° C. The insoluble 4-amino-2-methoxy-5-pyrimidinecarboxaldehyde is collected on a filter; M.P. 191–192° C. A solution of sodium 2-ethoxyethoxide is prepared from 0.42 g. of sodium and 180 ml. of 2-ethoxyethanol, and 6.9 g. of 4-amino-2-methoxy-5-pyrimidinecarboxaldehyde, and 6.6 g. of p-methoxyphenylacetonitrile are added. The mixture is heated at reflux for 2 hours and cooled and the insoluble product 7-amino-2-methoxy-6-(p-methoxyphenyl)pyrido[2,3-d]pyrimidine is collected on a filter; M.P. 230–231° C. following crystallization from aqueous dimethylformamide.

I claim:

1. A member of the class consisting of 2,7-diamino-6-arylpyrido[2,3-d]pyrimidine compounds of the formula

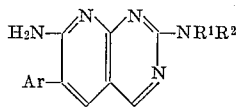

and salts thereof; where each of $R^1$ and $R^2$ is a member of the class consisting of hydrogen and lower alkyl; and Ar is a member of the class consisting of thienyl, furyl, pyrrolyl, pyridyl, and groups of the formula

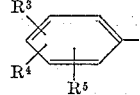

where each of $R^3$, $R^4$, and $R^5$ is a member of the class consisting of hydrogen, lower alkyl, lower alkoxy, lower alkylthio, halogen, hydroxy, nitro, amino, and di-(lower alkyl)amino.

2. A compound according to claim 1 wherein each of $R^1$ and $R^2$ represents hydrogen and Ar represents phenyl.

3. A compound according to claim 1 wherein each of $R^1$ and $R^2$ represent hydrogen and Ar represents p-methoxyphenyl.

4. 2,7-diamino - 6 - (p - methoxyphenyl)pyrido[2,3-d]-pyrimidine.

5. Acid-addition salts of 2,7-diamino-6-(p - methoxyphenyl)pyrido [2,3-d]pyrimidine.

References Cited

UNITED STATES PATENTS 3,021,332   2/1962   Hitchings et al. ---- 260—256.4

ALEX MAZEL, Primary Examiner

R. J. GALLAGHER, Assistant Examiner

U.S. Cl. X.R.

260—256.5, 345.9; 424—200, 232, 251